United States Patent
Lim et al.

(10) Patent No.: US 10,490,355 B2
(45) Date of Patent: Nov. 26, 2019

(54) THIN FILM CAPACITOR AND MANUFACTURING METHOD THEREOF

(71) Applicant: SAMSUNG ELECTRO-MECHANICS CO., LTD., Suwon-si, Gyeonggi-do (KR)

(72) Inventors: Seung Mo Lim, Suwon-si (KR); Hai Joon Lee, Suwon-si (KR); Ho Phil Jung, Suwon-si (KR); Jong Beom Kim, Suwon-si (KR); Kyo Yeol Lee, Suwon-si (KR); Dong Joon Oh, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/409,872

(22) Filed: Jan. 19, 2017

(65) Prior Publication Data
US 2017/0330688 A1 Nov. 16, 2017

(30) Foreign Application Priority Data
May 13, 2016 (KR) .......................... 10-2016-0058750

(51) Int. Cl.
*H01G 4/30* (2006.01)
*H01G 4/005* (2006.01)
*H01G 4/06* (2006.01)

(52) U.S. Cl.
CPC ............. *H01G 4/306* (2013.01); *H01G 4/005* (2013.01); *H01G 4/06* (2013.01)

(58) Field of Classification Search
CPC .......... H01G 4/306; H01G 4/005; H01G 4/06

USPC ...................................................... 361/301.4
See application file for complete search history.

(56) References Cited

U.S. PATENT DOCUMENTS

| 6,388,865 | B1* | 5/2002 | Honda ..................... H01G 4/30 361/301.4 |
| 2011/0058305 | A1 | 3/2011 | Taki |
| 2012/0224297 | A1* | 9/2012 | Sakurai .................. H01L 28/55 361/311 |
| 2012/0307469 | A1* | 12/2012 | Oka ........................ H01G 4/33 361/782 |

(Continued)

FOREIGN PATENT DOCUMENTS

| JP | 10-2008-85291 A | 4/2008 |
| KR | 2003-0050949 A | 6/2003 |

(Continued)

OTHER PUBLICATIONS

Notice of Office Action Korean Patent Application No. 10-2016-0058750 dated Mar. 16, 2017 with English translation.

*Primary Examiner* — Michael P McFadden
(74) *Attorney, Agent, or Firm* — Morgan, Lewis & Bockius LLP

(57) ABSTRACT

A thin film capacitor includes a body including a lower electrode formed on a substrate, a plurality of first electrode layers, and a plurality of second electrode layers stacked alternately with the plurality of first electrode layers, with one of the dielectric layers interposed therebetween. The lower electrode and the first electrode layer have the same polarity as each other, and surface roughness of the first and second electrode layers is less than that of the dielectric layers, thereby securing capacitance and characteristics of the dielectric layers.

14 Claims, 4 Drawing Sheets

(56) References Cited

U.S. PATENT DOCUMENTS

2014/0022698 A1   1/2014   Jeong et al.

FOREIGN PATENT DOCUMENTS

KR   10-2007-0033258 A   3/2007
KR   10-2014-0012494 A   2/2014

* cited by examiner

THIN FILM CAPACITOR AND MANUFACTURING METHOD THEREOF

CROSS-REFERENCE TO RELATED APPLICATION(S)

This application claims benefit of priority to Korean Patent Application No. 10-2016-0058750, filed on May 13, 2016 in the Korean Intellectual Property Office, the disclosure of which is incorporated herein by reference in its entirety.

TECHNICAL FIELD

The present disclosure relates to a thin film capacitor and a manufacturing method thereof.

BACKGROUND

Recently, as application processors (AP) of smartphones have become thinner, the necessity for a thin film capacitor, thinner than a multilayer ceramic capacitor (MLCC), has increased.

The thin film capacitor may be developed at a thin thickness using a thin film technology, but has a large limitation in the number of dielectric layers that may be stacked as compared to the MLCC, such that it is difficult to implement high capacitance.

A thin film deposited by a sol-gel method, a sputtering method, a chemical vapor deposition (CVD) method, a pulsed laser deposition (PLD) method, and the like, which are thin film technologies, may have excellent characteristics depending on deposition conditions, but in the case of stacking a plurality of layers, since properties of a lower electrode or a layer serving as a seed layer dominate characteristics of a dielectric layer deposited thereon, generally, as the number of layers is increased, characteristics of the dielectric layer may deteriorate rapidly.

In detail, the reason for this deterioration is that, at the time of manufacturing a capacitor, a flat film may be suitably deposited on a lower electrode, but in the case of depositing a dielectric layer on the lower electrode and depositing an electrode layer on the dielectric layer, the roughness of the electrode layer may be significantly increased due to dielectric grains of the dielectric layer, and a rough surface of the dielectric layer is substantially reflected in an upper electrode.

In a case of stacking the dielectric layer on the electrode layer having a rough surface, since the dielectric layer is deposited on a seed layer that is not flat, crystallinity of the dielectric layer may be significantly deteriorated, and the roughness may also be significantly increased.

When the stacking as described above is repeatedly performed, the dielectric layer may include non-uniformly formed grains, permittivity may be deteriorated, and leakage characteristics through a grain boundary may be deteriorated, such that it may be difficult to manufacture the capacitor by stacking the electrode layers and the dielectric layers.

Therefore, a thin film capacitor in which characteristics of a dielectric layer may be secured and a plurality of electrode layers and dielectric layers are stacked should be developed.

SUMMARY

An aspect of the present disclosure may provide a thin film capacitor in which a plurality of electrode layers and dielectric layers may be stacked due to flat electrode layers and thus, capacitance and characteristics of the dielectric layer may be secured.

According to an aspect of the present disclosure, a thin film capacitor may include a body including a lower electrode formed on a substrate, a plurality of first electrode layers, and a plurality of second electrode layers stacked alternately with the plurality of first electrode layers, with one of the dielectric layers interposed therebetween, wherein the lower electrode and the first electrode layer have the same polarity as each other, and surface roughness of the first and second electrode layers is less than that of the dielectric layer, thereby securing capacitance and characteristics of the dielectric layer.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, exemplary embodiments in the present disclosure will be described in detail with reference to the accompanying drawings.

A thin film capacitor according to the present disclosure will hereinafter be described.

Figure 1:
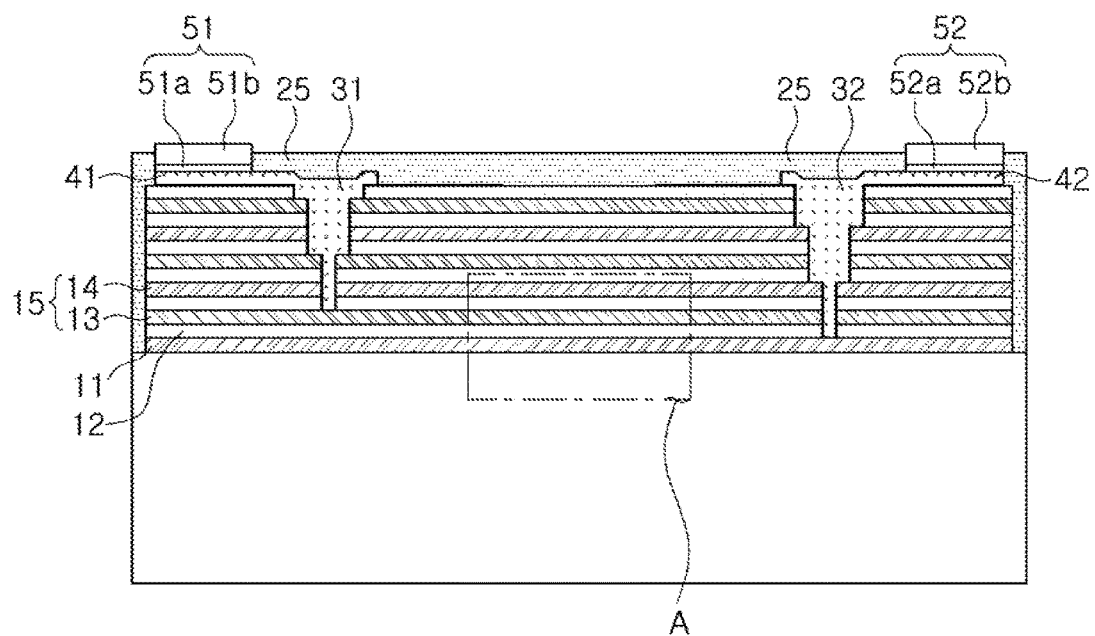
FIG. 1 is a schematic cross-sectional view illustrating a thin film capacitor according to an exemplary embodiment in the present disclosure.
Figure 2:
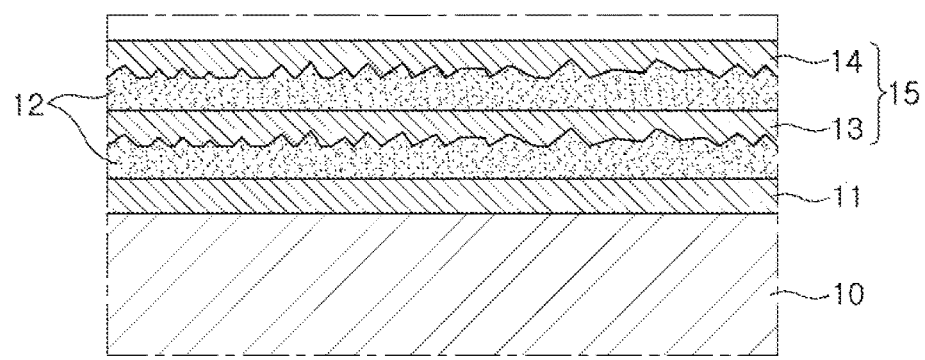
FIG. 2 is an enlarged view of part A of FIG. 1.

FIG. 1 is a schematic cross-sectional view illustrating a thin film capacitor according to an exemplary embodiment in the present disclosure, and FIG. 2 is an enlarged view of part A of FIG. 1.

Referring to FIGS. 1 and 2, the thin film capacitor according to the exemplary embodiment in the present disclosure may include a body including a lower electrode 11 formed on a substrate 10, and electrode layers 15 including a plurality of first electrode layers 14 and a plurality of second electrode layers 13 stacked alternately with the plurality of first electrode layers 14, with one of the dielectric layers 12 interposed therebetween. The lower electrode 11 and the first electrode layer 14 have the same polarity as each other, and surface roughness of the electrode layers including the first and second electrode layers 14 and 13 is less than that of the dielectric layer 12.

The substrate 10 may be a layer (substrate) contacting the lower electrode 11 and having an insulation property, and may be formed of one selected from $Al_2O_3$, $SiO_2/Si$, MgO, $L_aAlO_3$, and $SrTiO_3$, but is not limited thereto. Preferably, the substrate 10 may have sufficient flatness and surface roughness.

The body, having a stacked structure in which the lower electrode 11 is formed on the substrate 10, the dielectric layer 12 is formed on the lower electrode 11, and the second electrode layer 13 is formed on the dielectric layer 12, may be formed as a stacked body in which a plurality of first and second electrode layers 14 and 13 are alternately stacked, with respective dielectric layers 12 interposed therebetween.

In the present disclosure, the terms "first and second" mean different polarities.

The body may include first and second vias 31 and 32, electrically connected to the first and second electrode layers 14 and 13, respectively, first and second connection electrodes 41 and 42 disposed on an upper surface of the body and connected to the first and second vias 31 and 32, respectively, first and second electrode pads 51 and 52 disposed on the first and second connection electrodes 41 and 42, respectively, the stacked structure, and a protective layer 25 formed to enclose the first and second vias 31 and 32 and the first and second connection electrodes 41 and 42.

The first and second vias 31 and 32 and the first and second connection electrodes 41 and 42 may be formed of the same material as each other by a plating method.

The first and second electrode pads 51 and 52 may be formed of a conductive material by a plating method.

The conductive material may be copper (Cu), aluminum (Al), gold (Au), silver (Ag), platinum (Pt), or the like, but is not limited thereto.

The first and second electrode pads 51 and 52 may include seed layers 51a and 52a and electrode layers 51b and 52b formed from the seed layers 51a and 52a, respectively.

The protective layer 25 may be formed in order to prevent the stacked body, the first and second vias 31 and 32, and the first and second connection electrodes 41 and 42 from being degraded or polluted due to moisture from the outside or due to chemical reactions with oxygen from the outside, and prevent the stacked body, the first and second vias 31 and 32, and the first and second connection electrodes 41 and 42 from being damaged at the time of mounting the thin film capacitor on a board.

The protective layer 25 may be formed of a material having high heat resistance, for example, an organic thermosetting material or photo-curable material such as polyimide.

The first and second electrode layers 14 and 13 may each be formed of a single layer without a predetermined pattern.

The first and second electrode layers 14 and 13 may be formed of a conductive material.

The conductive material may be copper (Cu), aluminum (Al), gold (Au), silver (Ag), platinum (Pt), or the like, but is not limited thereto.

A process of forming the dielectric layer 12, which is a high-permittivity thin film, may be accompanied by a high-temperature thermal history, and thus, the electrode layer 15 may be diffused to the dielectric layer 12 or reacted with the dielectric layer 12, thereby increasing a leakage current in the capacitor.

The first and second electrodes 14 and 13 may be formed of platinum (Pt), which is a high melting point material, and thus diffusion of the first and second electrodes 14 and 13 to the dielectric layer or a reaction of the first and second electrodes 14 and 13 with the dielectric layer 12 may be decreased.

The dielectric layer 12, which contains a material having high permittivity, may contain a perovskite material.

The perovskite material may be a dielectric material having high permittivity, for example, a barium titanate ($BaTiO_3$)-based material, a strontium titanate ($SrTiO_3$)-based material, a $TiO_3$ based material, a PZT based material, or the like, but is not limited thereto.

Generally, in a case of a dielectric layer formed on an electrode layer having a rough surface, since the electrode layer serving as a seed layer does not have a flat surface, crystallinity of the dielectric layer may be significantly deteriorated, and roughness thereof may also be significantly increased. When the stacking as described above is repeatedly performed, the dielectric layer may include non-uniformly formed grains, permittivity may be deteriorated, and leakage characteristics through a grain boundary may be deteriorated, such that it may be difficult to manufacture the capacitor by stacking the electrode layers and the dielectric layers.

Referring to FIG. 2, in the thin film capacitor according to the exemplary embodiment in the present disclosure, surface roughness of the first and second electrode layers 14 and 13 may be less than that of the dielectric layer 12. Therefore, a plurality of electrode layers 15 and dielectric layers may be stacked, such that capacitance of the capacitor and characteristics of the dielectric layers 12 may be secured.

The surface roughness of the first and second electrode layers 14 and 13 and the dielectric layer 12 may be surface roughness with respect to upper surfaces thereof, and the first and second electrode layers 14 and 13 may have a flat surface as compared to the dielectric layer 12.

The surface roughness Ra of the dielectric layer 12 may be 2 to 5 nm, and the surface roughness of the first and second electrode layers 15 may be 0.5 to 1.5 nm.

In a case of the capacitor, the higher the permittivity of the material of the dielectric layer, the wider the surface area of the dielectric layer contacting the electrode layer, the thinner the thickness of the dielectric layer, and the higher the capacitance of the capacitor. Therefore, in order to increase the surface area of the dielectric layer contacting an internal electrode as a method for securing capacitance of the capacitor, the capacitor needs to have a structure in which a plurality of electrode layers and dielectric layers are stacked, and to be manufactured at a layer thickness at which leakage characteristics may be satisfied.

In the thin film capacitor according to the present disclosure, since a surface area of the upper surface of the dielectric layer 12 contacting lower surfaces of the first and second electrode layers 14 and 13 may be increased, and the dielectric layer 12 may be continuously formed, high capacitance of the capacitor may be secured.

More specifically, in a case in which a difference between surface roughness of the upper surface of the dielectric layer 12 and surface roughness of the first and second electrode layers 14 and 13 is 1 nm to 4 nm, the upper surface of the dielectric layer 12 may be in a form of a mirror surface, and the surface area of the upper surface of the dielectric layer 12 contacting the lower surfaces of the first and second electrode layers 14 and 13 may be increased as compared to a case in which the upper surface of the dielectric layer is flat.

Further, in the thin film capacitor, the dielectric layer may be formed not to have irregular surface roughness by allowing the surfaces of the first and second electrode layers serving as the seed layer for forming the dielectric layer to be flat, and a plurality of first and second electrodes and dielectric layers may be stacked. Therefore, capacitance of the capacitor may be secured and degradation of the characteristics of the dielectric layer may be prevented.

That is, when the surface roughness of the upper surfaces of the first and second electrodes 14 and 13 is less than that of the upper surface of the dielectric layer 12, interfaces between the upper surfaces of the first and second electrode layers 14 and 13 and a lower surface of the dielectric layer 12 may become flat, such that a structure in which the plurality of first and second electrode layers 14 and 13 and dielectric layers 12 are stacked may be implemented.

Hereinafter, a manufacturing method of a thin film capacitor according to the present disclosure will be described.

FIGS. 3A through 3G are schematic process cross-sectional views for describing a manufacturing method of a thin film capacitor according to another exemplary embodiment in the present disclosure.

Referring to FIGS. 3A through 3G, the manufacturing method of a thin film capacitor according to the exemplary embodiment in the present disclosure may include providing a substrate 10, of which a lower electrode 11 is formed on at least one surface, forming a dielectric layer 12 on the lower electrode 11, and forming an electrode layer 15 which may be a second electrode layer 14 or a first electrode layer 13 on the dielectric layer 12. At least two dielectric layers 12 and at least two electrode layers 15 are alternately stacked, and surface roughness of the electrode layer 15 is less than that of the dielectric layer 12.

Figure 3A:
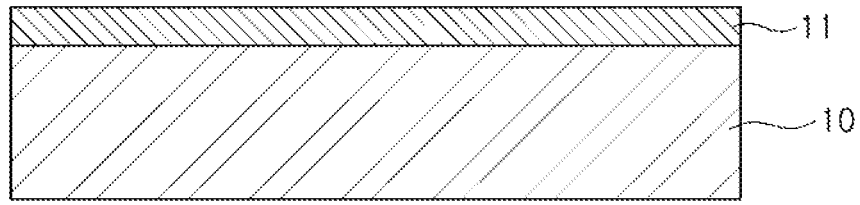
FIGS. 3A through 3G are schematic process cross-sectional views describing a manufacturing method of a thin film capacitor according to another exemplary embodiment in the present disclosure.

Referring to FIG. 3A, the substrate 10, on which the lower electrode 11 is formed on one surface, may be provided.

The substrate 10 may be a layer (substrate) directly below a first electrode layer and having an insulation property and may be formed of one selected from $Al_2O_3$, $SiO_2/Si$, MgO, $L_aAlO_3$, and $SrTiO_3$, but is not limited thereto. Preferably, the substrate 10 may have sufficient flatness and surface roughness.

The lower electrode 11 may be formed on the substrate and formed of a conductive material.

The conductive material may be copper (Cu), aluminum (Al), gold (Au), silver (Ag), platinum (Pt), or the like, but is not limited thereto.

The lower electrode 11 may be formed by a sputtering method, a vapor synthesis method such as a vapor deposition method, or the like, and be processed by a photolithography method and a dry etching method.

The lower electrode 11 may have a flat surface for high crystallinity of the dielectric layer 12 to be formed on an upper surface thereof.

Figure 3B:
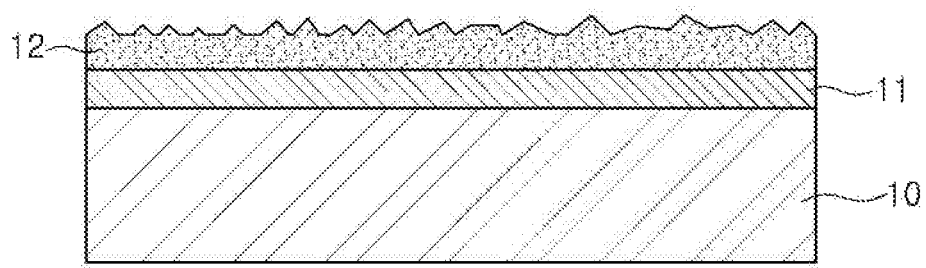
Figure 3C:
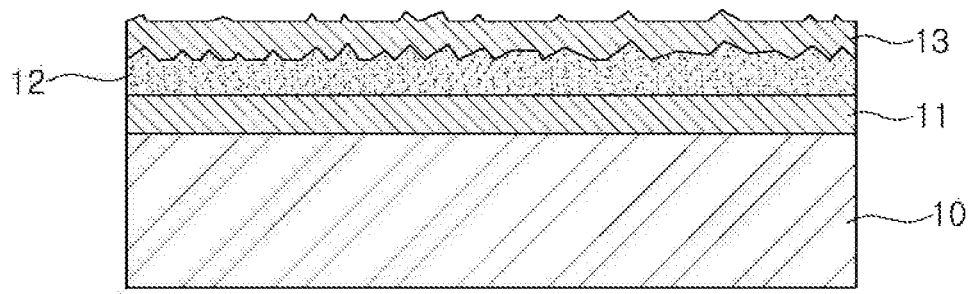

Next, referring to FIG. 3B, the dielectric layer 12 may be formed on the lower electrode 11.

The dielectric layer 12, which contains a material having high permittivity, may contain a perovskite material.

The perovskite material may be a dielectric material of which permittivity may be significantly changed, for example, a barium titanate ($BaTiO_3$)-based material, a strontium titanate ($SrTiO_3$)-based material, a (Ba, Sr) $TiO_3$ based material, a PZT based material, or the like, but is not limited thereto.

The dielectric layer 12 may be formed by a sol-gel method, a sputtering method, a laser ablation method, or the like.

The dielectric layer 12 may have high crystallinity in order to secure high permittivity.

Crystallinity of the dielectric layer 12 may be adjusted by a temperature at the time of forming the dielectric layer or an annealing temperature after forming the dielectric layer 12.

In a case in which the temperature at the time of forming the dielectric layer 12 or the annealing temperature after forming the dielectric layer 12 is high, crystallinity of the dielectric layer 12 may be increased.

At the time of forming the dielectric layer 12, a crystal growth direction of grains in the dielectric layer 12 may be at least two of (100), (111), and (110) orientations and the crystal growth direction of the grain may be adjusted by the temperature at the time of forming the dielectric layer 12 or the annealing temperature after forming the dielectric layer 12.

In a case in which the grain of the dielectric layer 12 grows in the (100)-facing direction, the grain may grow in a large pillar shape in the dielectric layer 12, in a case in which the grain of the dielectric layer 12 grows in the (111) facing direction, the grain may grow in a tetrahedral shape in the dielectric layer 12, and in a case in which the grain of the dielectric layer 12 grows in the (110) facing direction, the grain may grow in a triangular prism shape in the dielectric layer 12.

In a case in which the dielectric layer 12 is formed by the sputtering method, the dielectric layer 12 may be composed of grains having a size of about several ten to several hundreds nm. The grain may grow in a pillar shape or a mass shape, and an upper surface of the dielectric layer 12 may be rough, due to unevenness of each of the grains.

The surface roughness Ra of the dielectric layer 12 may be 2 to 5 nm.

Since the thinner the thickness of the dielectric layer 12, the stronger the strength of an electric field, high capacitance may be secured, and in a case in which the dielectric layer 12 is formed to have a thickness thicker than the desired thickness, the dielectric layer 12 may have smooth roughness by a trimming method.

The trimming method may be a dry etching method, such as an ion beam etching method or a chemical mechanical polishing (CMP) method.

Since, in a case in which the thickness of the dielectric layer 12 is excessively thin, leakage current may be increased or permittivity may be decreased, there is a need to set a suitable thickness of the dielectric layer 12.

Before the dielectric layer 12 is formed, surface treatment for flatness of the surface may be performed by maintaining the substrate 10 on which the lower electrode 11 is formed at a high temperature for a predetermined time or irradiating plasma or ion on the surface of the lower electrode 11.

Then, referring to FIGS. 3C through 3G, the electrode layer 15 may be formed on the dielectric layer 12.

The electrode layer 15 such as the second electrode layer 13 may be formed of a conductive material, for example, copper (Cu), aluminum (Al), gold (Au), silver (Ag), platinum (Pt), or the like, but is not limited thereto. The electrode layer may be formed of the same material as that of the lower electrode.

The electrode layer 15 may be formed on the dielectric layer 12 by a sputtering method, a vapor synthesis method such as a vapor deposition method, or the like, and be processed by a photolithography method and a dry etching method.

Surface roughness Ra of the electrode layer 15 may be 0.5 to 1.5 nm, and may be smaller than that of the dielectric layer 12. That is, the electrode layer 15 may have a flat surface as compared to the dielectric layer 12.

The electrode layer 15 has a flat surface, such that at least two dielectric layers 12 and at least two electrode layers 15 may be alternately stacked.

When the surface roughness of the electrode layer 15 is in a range of 0.5 to 1.5 nm, high crystallinity of a dielectric layer to be formed thereafter may be secured.

Figure 3D:
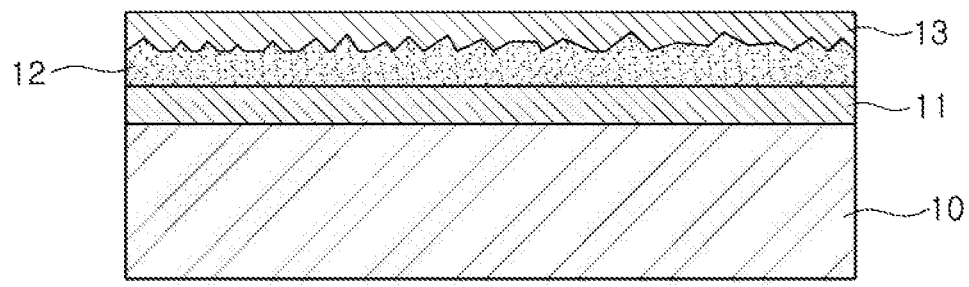
Figure 3E:
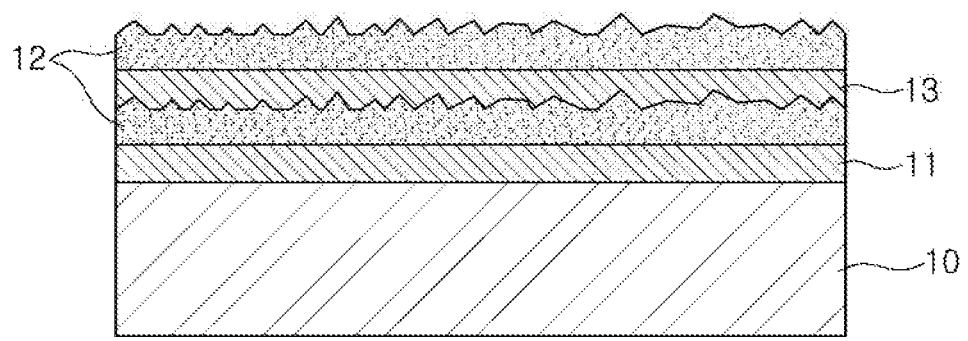
Figure 3F:
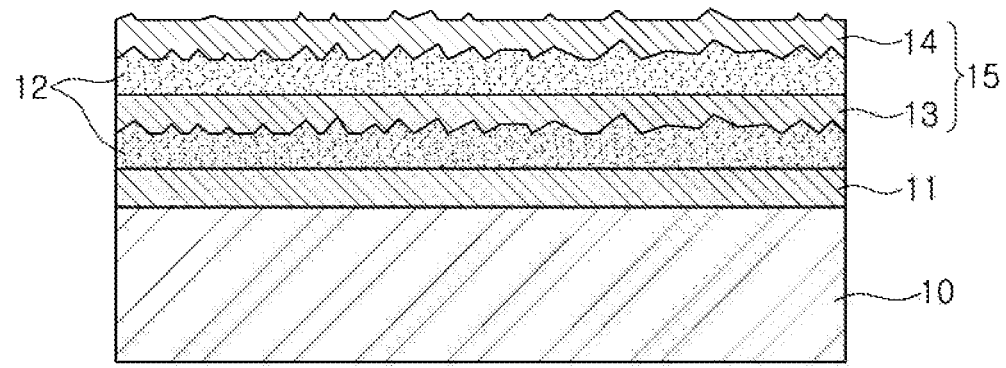
Figure 3G:
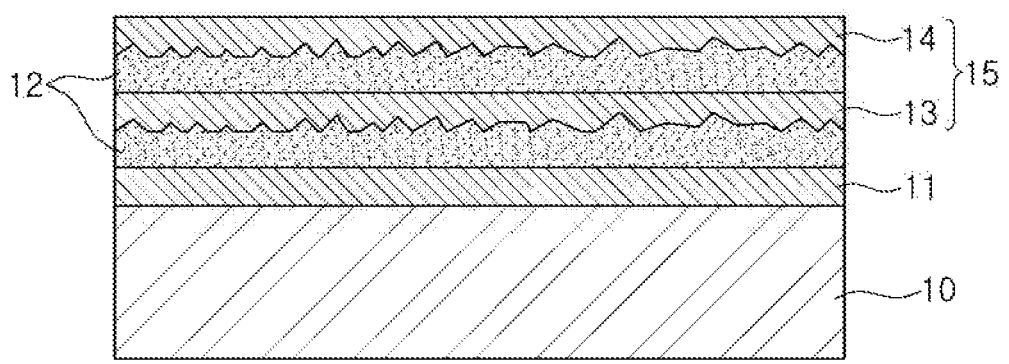

After the electrode layer 15 is formed, in a case in which the surface rough ness of the electrode layer 15 is more than 1.5 nm, the electrode layer 15 having a flat surface may be formed by performing surface treatment on the surface of the electrode layer, as illustrated in FIGS. 3D and 3G.

The surface treatment, the purpose of which is to planarize the surface of the electrode layer 15, may be performed by etching and polishing. For example, the surface treatment may be performed by a dry etching method, such as an ion beam etching method or a chemical mechanical polishing (CMP) method, but is not limited thereto.

In the manufacturing method of a thin film capacitor according to the present disclosure, capacitance of the thin film capacitor may be secured, and degradation of the characteristics of the dielectric layer 12 may be prevented, by allowing the dielectric layer to be very rough, and planarizing the surface of the electrode layer 15 serving as the seed layer for forming the dielectric layer 12 so that the plurality of dielectric layers 12 and electrode layers 15 may be stacked.

Thereafter, a via may be formed in the body so that the electrode layer may be electrically connected to the outside.

As set forth above, according to exemplary embodiments in the present disclosure, the thin film capacitor may include the electrode layer having surface roughness less than that of the dielectric layer, such that the plurality of electrode layers and dielectric layers may be stacked, thereby securing the characteristics of the dielectric layer while securing capacitance.

While exemplary embodiments have been shown and described above, it will be apparent to those skilled in the art that modifications and variations could be made without departing from the scope of the present invention, as defined by the appended claims.

What is claimed is:

1. A thin film capacitor comprising:
   a body including first electrode layers having a first polarity, and second electrode layers having a second polarity different from the first polarity and stacked alternately with the first electrode layers, with dielectric layers interposed therebetween; and
   a first via penetrating into the body and electrically connected to the first electrode layers, and a second via penetrating into the body and electrically connected to the second electrode layers,
   wherein a first surface roughness of an entire interface of one of the first electrode layers and one of the dielectric layers is less than a second surface roughness of an entire interface of one of the second electrode layers and the one of the dielectric layers.

2. The thin film capacitor of claim 1, wherein the second surface roughness is 2 to 5 nm.

3. The thin film capacitor of claim 1, wherein the first surface roughness is 0.5 to 1.5 nm.

4. The thin film capacitor of claim 1, further comprising:
   a substrate; and
   a lower electrode having the first polarity and disposed between the substrate and a lowermost one of the first electrode layers.

5. The thin film capacitor of claim 1, wherein the dielectric layers include crystal grains.

6. A thin film capacitor comprising:
   a substrate;
   a plurality of dielectric layers disposed on one side of the substrate;
   a plurality of first electrode layers electrically connected to a first external electrode via a first via penetrating in at least portions of the plurality of dielectric layers, and disposed on the one side of the substrate; and
   a plurality of second electrode layers disposed on the one side of the substrate, stacked alternately with the plurality of first electrode layers, with one of the plurality of dielectric layers interposed therebetween, and electrically connected to a second external electrode via a second via penetrating in at least other portions of the plurality of dielectric layers,
   wherein a surface roughness of an upper surface of one of the plurality of dielectric layers is greater than that of a lower surface of the one of the plurality of dielectric layers, a distance from the lower surface of the one of the plurality of dielectric layers to the substrate being less than a distance from the upper surface of the each of the plurality of dielectric layers to the substrate, and
   a first surface roughness of an entire interface of one of the first electrode layers and the one of the dielectric layers is less than a second surface roughness of an entire interface of one of the second electrode layers and the one of the dielectric layers.

7. The thin film capacitor of claim 6, wherein a surface roughness of a lower surface of one of the plurality of first electrode layers and the plurality of second electrode layers is greater than that of an upper surface of the one of the plurality of first electrode layers and the plurality of second electrode layers.

8. The thin film capacitor of claim 7, wherein a distance from the lower surface of the one of the plurality of first electrode layers and the plurality of second electrode layers to the substrate is less than a distance from the upper surface of the one of the plurality of first electrode layers and the plurality of second electrode layers to the substrate.

9. The thin film capacitor of claim 6, wherein the plurality of dielectric layers include crystal grains.

10. A thin film capacitor, comprising:
    a substrate,
    a body including first electrode layers having a first polarity, and second electrode layers having a second polarity different from the first polarity and stacked alternately with the first electrode layers, with dielectric layers interposed therebetween;
    a lower electrode having the first polarity and disposed between the substrate and a lowermost one of the first electrode layers; and
    a lower dielectric layer disposed between the lower electrode and the lowermost one of the first electrode layers,
    wherein a first surface roughness of an entire interface of one of the first electrode layers and one of the dielectric layers is less than a second surface roughness of an entire interface of one of the second electrode layers and the one of the dielectric layers, and
    surface roughness of an entire interface of the lower electrode and the lower dielectric layer is less than surface roughness of an entire interface of the lowermost one of the first electrode layers and the lower dielectric layer.

11. A thin film capacitor comprising:
    a substrate;
    a plurality of dielectric layers disposed on one side of the substrate;
    a plurality of first electrode layers electrically connected to a first external electrode via a first via penetrating in at least portions of the plurality of dielectric layers, and disposed on the one side of the substrate;
    a plurality of second electrode layers disposed on the one side of the substrate, stacked alternately with the plurality of first electrode layers, with one of the plurality of dielectric layers interposed therebetween, and electrically connected to a second external electrode via a second via penetrating in at least other portions of the plurality of dielectric layers; and
    a lower dielectric layer disposed between a lower electrode and a lowermost one of the first electrode layers,
    wherein a surface roughness of an entire interface of the lower electrode and the lower dielectric layer is less than a surface roughness of an entire interface of the lowermost one of the first electrode layers and the lower dielectric layer, and a surface roughness of an upper surface of one of the plurality of dielectric layers is greater than that of a lower surface of the one of the plurality of dielectric layers, a distance from the lower surface of the one of the plurality of dielectric layers to the substrate being less than a distance from the upper surface of the each of the plurality of dielectric layers to the substrate.

12. The thin film capacitor of claim 11, wherein a surface roughness of a lower surface of one of the plurality of first electrode layers and the plurality of second electrode layers is greater than that of an upper surface of the one of the plurality of first electrode layers and the plurality of second electrode layers.

13. The thin film capacitor of claim 12, wherein a distance from the lower surface of the one of the plurality of first electrode layers and the plurality of second electrode layers to the substrate is less than a distance from the upper surface of the one of the plurality of first electrode layers and the plurality of second electrode layers to the substrate.

14. The thin film capacitor of claim 11, wherein the plurality of dielectric layers include crystal grains.

* * * * *